Patented Mar. 5, 1929.

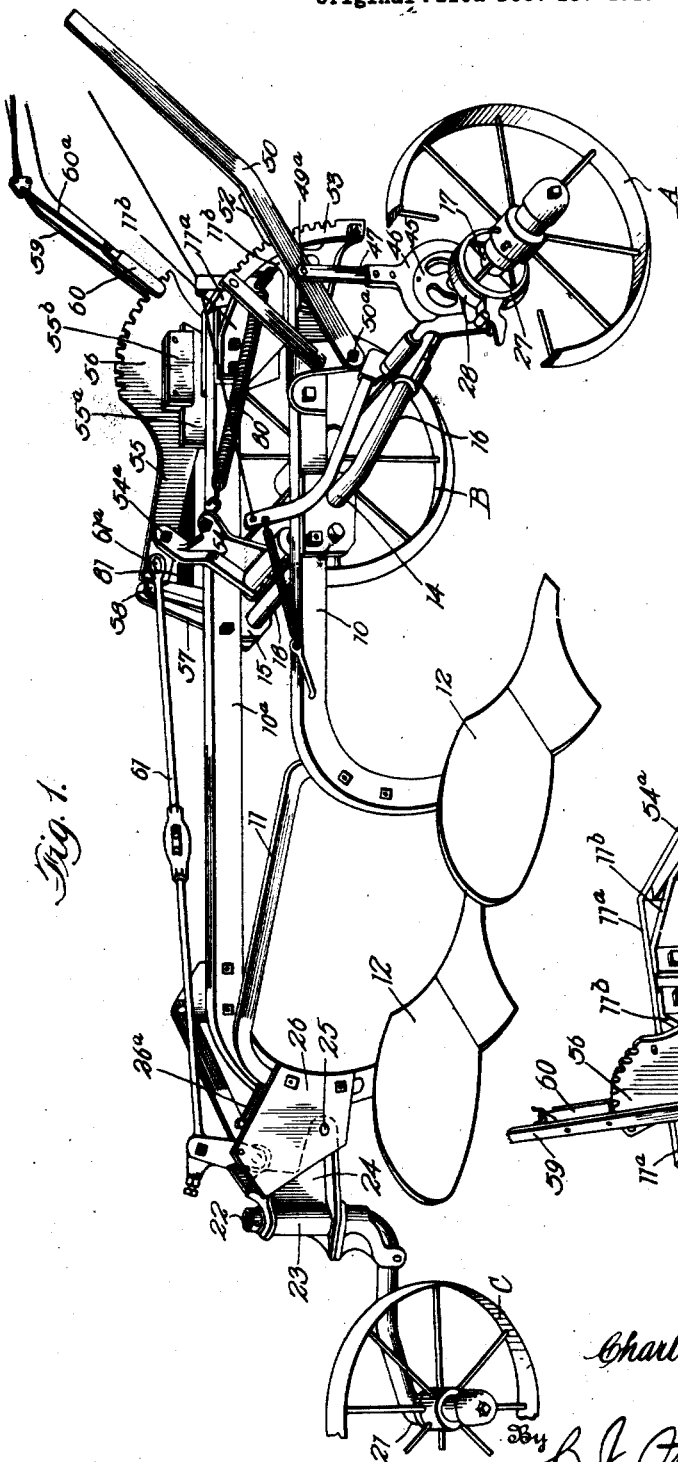

1,704,340

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

PLOW.

Original application filed December 15, 1919, Serial No. 344,962. Renewed November 16, 1925. Divided and this application filed September 10, 1926. Serial No. 134,640.

This application is a division of my application for Letters Patent of the United States, filed December 15, 1919, Serial Number 344,962, and renewed November 16, 1925, entitled Improvements in plows and which on the 9th day of November 1926 matured into Patent Number 1,606,132.

It relates particularly to a combination and correlation of parts by which crank axles carried by the supporting wheels at opposite sides of the implement will be caused simultaneously to move pivotally with relation to the frame of the implement to thereby cause simultaneous movement of the said wheels in one direction to lower the frame and ground working elements from transport position to working position and in the opposite direction to raise said frame and ground working elements from working position to transport position, and which combination and correlation also will apply power to an element which controls corresponding movements of a supporting wheel at the rear end of the implement.

One of the important purposes of the present invention is to provide a means of the kind referred to which is particularly characterized by the capability of an adjustment of one of the crank axles relatively to the other, into any one of a plurality of selected positions. Another of the important purposes of the invention is to provide a combination and correlation of parts in which power applied to one of the supporting wheels to raise or lower the frame into and from transport position will be transmitted correspondingly to the other wheels through a mechanism which permits adjustment of the wheels at one side of the element to thereby variably determine the depth of penetration of the ground working elements and additionally permits an adjustment of the supporting wheel at the other side to level the frame.

These several purposes, and others which will be apparent to those skilled in the art from the following description of my invention, are secured from the construction illustrated in the accompanying drawings, and in which drawings:—

Fig. 1 is a perspective view of a power lift gang plow embodying the present improvements viewed from the furrow side.

Fig. 2 is a detail perspective view particularly intended to show the connection between the furrow wheel axle and the land wheel axle, this view being taken from the side of the implement opposite to that which it is seen in Fig. 1.

Similar characters of reference denote corresponding parts in both of the views.

The drawings illustrate the invention in its application to a power lift gang plow and will be particularly described with reference to its said application without, however, intending to restrict it exclusively to such application. It may be embodied in tillage implements other than gang plows and certain of its novel features and combinations may be usefully employed in tillage implements which do not include any power lift mechanism for raising the frame and ground working element or elements from ground working position to transport position and for lowering said frame and element or elements from transport position to ground working position. It should be understood that the term "power lift mechanism" herein employed has reference to those mechanisms which include a clutch which is under control of the operator and which, when its driving and driven members are locked together, operate to cause the ground working element or elements to be raised and lowered by power derived from one of the ground engaging wheels of the implement. These mechanisms usually operate by successive half-revolutions to raise and lower the ground working element, respectively, and include means by which the driving and driven members are unlocked from each other at the end of each half-revolution. Such power lift mechanisms are well known in the art. While no claim is herein made broadly for such mechanism and notwithstanding, as already stated, the invention is not exclusively confined to a tillage implement which includes a power lift mechanism, yet I would have it understood that its detail construction exemplified in the drawings has particular advantages in connection with a tillage implement having a power lift mechanism since it very efficiently and effectively co-acts with said mechanism in permitting adjustment of the ground working element or elements to variably regulate the depth of penetration of said element or elements into the soil and in permitting adjustment of one side of the frame relatively to the other for leveling purposes, and finally as a means for transmitting pivotal movement from the means to which the power for raising and lowering the frame and ground working element or elements is applied by the power lift mechanism to the corresponding axle at the other side of the implement and to an element which controls corresponding movement of the supporting wheel at the opposite end of the implement. For these reasons certain of the appended claims are based upon a tillage implement of the power-lift type including novel combinations and correlations of elements of the power lift mechanism and elements which form connections between the axles and which permit relative adjustments.

A detail explanation of the particular embodiment illustrated by way of example in the accompanying drawings, follows:—

The illustrated frame comprises two substantially parallel longitudinal beams 10, 10$^a$, tied together near their rear ends by a transverse connecting element 11 and at their front ends by a transverse member 11$^a$ and corner brackets 11$^b$. Each beam has a downwardly bent rear end to which is attached a plow body 12 of the single mold-board type. It will be understood, however, that any suitable construction of frame and that any tillage or ground working element of a kind suitable for use with those parts which constitute the present invention are contemplated to be within the spirit of the invention.

A, B, and C designate the land and furrow wheels which support the implement, A being the front furrow wheel, B the land side wheel and C the rear furrow wheel. The front furrow wheel A and the land side wheel B are mounted on separate crank axles whose journaled portions, marked 14 and 18, respectively, extend transversely of the frame, from side to side of the latter and one immediately adjacent the other. These journaled portions are mounted in bearings 15 carried by the beams 10, 10$^a$. The crank portion of the axle of the furrow wheel A is designated 16 and said wheel is mounted upon the outwardly bent spindle portion 17 at the lower end of said crank portion. The crank portion of the axle of the land side wheel B is designated 19 and said land side wheel is mounted upon the outwardly bent spindle 20 at the lower end of said crank portion. The rear furrow wheel C is mounted to rotate upon the lower laterally extending end 21 of a crank axle having a vertical portion 22 which is mounted to rotate in a bearing 23 carried by a bearing member 24 pivoted upon a horizontal axis at 25 to sustaining plates 26, 26$^a$ securely fastened to the rear end of the adjacent beam 10$^a$.

The journaled portions 14 and 18 of the axles of the wheels, A and B, respectively, are provided with arms or cranks 54 and 57 which form elements of connections through which power applied to one of the axles to swing the crank portions of the latter may be transmitted to the other. The connections include a slidable member 55 having a segmental toothed forward end 56. The crank 54 has its upper end pivotally connected to the rear end of said slidable member, at 54$^a$.

The connections also include a link 58 whose rear end is pivotally attached to the upper end of the crank 57 and whose forward end is pivotally attached to a lever 59. The lower end of the lever 59 is pivoted, at 59$^a$, to the forward end of the slidable member 55. This lever 59 is provided with a latch 60 having an operating element 60$^a$ which, in the embodiment illustrated, is intended to extend to within convenient reach of the operator on the tractor. It should be here mentioned that the particular illustrated embodiment of the invention is a tillage implement of the kind intended to be drawn by a tractor. 61 designates a longitudinally movable member which forms an element of the connection to the rear furrow wheel, C. The forward end of this member 61 is pivoted at 61$^a$ to the sliding member 55. Its rear end has connection with the rear furrow wheel through the medium of elements of any nature suitable to cause relative up and down movement of the rear end of the frame and rear furrow wheel C when the sliding member is moved in one direction and the other, respectively. The said sliding member is guided in its movement longitudinally of the frame by guiding elements 55$^a$ and 55$^b$ attached to the frame and sliding member, respectively. Springs 80 and 81, whose rear ends are connected, respectively, to the cranks 54 and 57 and whose forward ends are connected to fixed parts of the implement frame, balance the weight of the implement and thereby reduce the force required to be expended in the raising of the parts.

It will be understood that when the lever 59 is latched to the sliding member 55 rotative movement of either journaled portion 14 or 18 of the axles will be transmitted to the other and will also cause longitudinal movement to be given the member 61. For example, if power be applied to the crank portion 16 of the axle of the furrow wheel A to swing said crank portion forward or backward with relation to the frame, the arm or crank 54 projecting from the journaled portion of said axle will move correspondingly and since this arm or crank is connected to the slidable member 55, the latter will be correspondingly moved and will impart like movement to the lever 59 which is latched to said sliding member and this lever will, through the link 58, apply power to the arm or crank 57 on the journaled portion 18 of the crank axle carried by the land wheel B. Movement of the sliding member 59 will impart corresponding movement to the link 61 and this in turn will cause corresponding movement to be imparted to the rear furrow wheel C.

On the other hand, it will be apparent that when the lever 59 is not latched to the sliding member 55, rotative movement imparted to either journaled portion 14 or 18 of the crank axles will not be transmitted to the other or have any effect on the rear furrow wheel. For instance, when the lever 59 is unlatched from the sliding member, it may be moved back and forth relatively to said member and when so moved, it will correspondingly swing the crank portion 19 of the land wheel axle without effecting corresponding movements of either furrow wheel A or C.

Further, it will be apparent that the wheels A, B and C are capable of back and forth movement relatively to the frame upon horizontal axes and that such movement may be transmitted to said wheels simultaneously and will raise the frame and ground working elements from working position to transport position and will lower said frame and ground working elements from transport position to working position, according to the direction of such movement of the wheels.

In this exemplification of the invention simultaneous movement of all of the wheels is primarily for the purpose of moving the ground working elements from and into transport position, and is effected by power derived from the rotation of one of the supporting wheels (the forward furrow wheel A in this particular instance), through the medium of a power lift mechanism of suitable construction. Provision, however should be made for an adjustment of the ground working element or elements to variably determine the depth of penetration thereof into the soil when in working position, and provision should also be made for the leveling of the frame in every position of adjustment of the ground working elements. It will be apparent that the pivotal adjustment of the lever 59 relatively to the sliding member 55 will be operative to level the frame and to normally govern the depth at which the tillage elements will work in the soil since during this particular adjustment the axle of the wheel B is swung in its bearing 15 on the frame forward or backward, as the case may be, without transmitting movement to the axle of the furrow wheel A, the sliding member 55 remaining stationary during this movement.

The power lift mechanism which I prefer to employ is shown, described and claimed in my parent application, which has issued as Patent No. 1,606,132, hereinbefore referred to, to which reference may be had for a full understanding as to the details thereof. Suffice it to say in the present application, that it comprises a clutch having a driving member 27 and a driven member 28, the driving member being suitably attached to the wheel A and the driven member rotative upon the spindle portion 17 of the crank axle upon which said wheel A is loosely mounted. The clutch also comprises suitable means by which the driven member may be attached to the driving member under control of the operator and will remain attached to said driving member throughout a partial revolution,—as a one-half revolution, for example—and at the end of said partial revolution will be automatically detached from said driving member and be in a position for a repetition of this operation when the operator desires such repetition. The illustrated power lift mechanism includes an eccentric 45 which is attached to the driven member of the clutch and has rotative movement within an eccentric strap 46 provided with an arm 47 whose upper end is pivoted at $47^a$ to a lever 50. This lever 50 is pivoted at $50^a$ to a fixed part of the frame and is provided with a latch, indicated at 52, by which it may be fixed in anyone of a number of selected positions to a tooth quadrant 53 suitably secured to the frame. The latch 52 in practice is as usual provided with a suitable operating member, which in the tractor drawn plow extends to within convenient reach of the operator on the tractor. The adjustment of the lever varies the angle to which the crank portion 16 of the axle of the furrow wheel A is set with reference to the frame and ground. It will be noted that in this adjustment the eccentric 45, strap 46 and arm 47 move as a unit about the axis $50^a$ and that the axle swings in its bearing in the frame, the direction of its swinging movement being forward or rearward according to the direction of movement given the lever 50. During this operation the clutch members are disengaged from each other and the wheel A runs free on the axle spindle 17. But in the operation of raising or lowering the implement by power derived from the forward travel of the implement the lever 50 substantially forms a fixed part of the frame, the eccentric 45 rotates with the wheel A and within the eccentric strap 46 and said strap and arm turn upon the pivot $47^a$. It will be understood that the high part of the eccentric 45 will be upward when the parts are in transport position and downward when they are in working position and that during the travel of the eccentric from one position to the other force will be exerted upon the axle spindle 17 to turn the axle portion 14 in its bearings in the main frame—the arm 47 and strap 46 in this movement swinging about the pivot $47^a$ as already stated. Assuming that at this time the lever 59 is latched to the sliding member 55, it will be apparent from what has already been stated that all of the wheels will be moved simultaneously toward the front or toward the rear of the frame, as the case may be, when power is thus applied to the axle of the wheel A, thereby raising or lowering the frame and ground working element or elements carried by the frame.

It will be noted that any movement given the lever 50, whether by hand or by power derived from the travel of the implement, will be operative to swing the crank axle to which said lever is connected in its bearings upon the frame and thereby to move the corresponding wheel backward or forward. It will be apparent from what has already been stated that while the present embodiment of the invention contemplates that the hand movement given the lever shall be merely for adjustment purposes, power lift means being provided to raise and lower the frame and ground working members when they have been thus adjusted, yet the invention in its broader aspects is not confined to the utilization of power lift mechanism. It will also be apparent that any movement given the lever 50 either by hand or by the power lift mechanism will be transmitted not only to the crank portion 16 of the axle of the wheel A but to the corresponding portions of the axles of the wheels B and C when the lever 59 is attached to the slide 55, and will not be transmitted to the axle of either of said wheels B or C when the lever 59 is not secured to said sliding member 55. Again, it will be remembered that when the lever 59 is detached from the sliding member 55, it may be operative to swing the wheel B back or forth relatively to the frame without the transmission of corresponding movement to either of the other wheels. There are thus provided facilities not only for the raising and lowering of the frame bodily from and into transport position but also for an adjustment of either side of the frame relatively to the other, through the medium of mechanism of simple and very practicable nature, whether applied to an implement having a power lift mechanism or to an implement in which the various adjustments and the movement bodily of the frame are accomplished wholly by hand or in part by hand and in part by a power lift mechanism.

Reverting now to the member 61 which has been referred to as a member which controls the relative movements of the rear end of the frame and the rear furrow wheel: it has been stated that the connection of the rear end between said member and the rear furrow wheel may be of any suitable kind. It may be here stated that the connection referred to is preferably that illustrated in my aforesaid patent since it has important advantages, particularly in the type of tractor drawn implement illustrated by way of example in the instant application.

Having thus described a preferred embodiment of my invention and described the same somewhat minutely without intending thereby to restrict the protection to the particular illustrated embodiment but being mindful at all times and wishing it to be clearly understood that the embodiment is merely exemplary and that changes in details may be made without departing from the spirit of the invention: what I claim is:—

1. A tillage implement comprising a soil turning member, supporting means therefor including crank axles journaled to turn about horizontal axes to thereby change the position of said member with relation to the ground, arms projecting from the journal portions of said axles, a slide pivotally connected at one of its ends to one of said arms and having arcuately disposed teeth at its other end, an adjusting lever pivoted to the latter end of the slide and carried thereby, a latch co-operating with the teeth to fix the lever adjustably to the slide, and a link extending alongside the slide and having its opposite ends pivoted to said lever and to the other crank, respectively, and serving to transmit movement from said lever to the latter crank.

2. A tillage implement comprising a soil turning member, supporting means therefor including crank axles journaled to turn about horizontal axes to thereby change the position of said member with relation to the ground, arms projecting from the journal portions of said axles, a slide pivotally connected at one of its ends to one of said arms and having arcuately disposed teeth at its other end, an adjusting lever pivoted to the latter end of the slide and carried thereby, a latch co-operating with the teeth to fix the lever adjustably to the slide, a link extending alongside the slide and having its opposite ends pivoted to said lever and to the other crank, respectively, and serving to transmit movement from said lever to the latter crank and an adjusting lever for that crank axle to which the slidable member is connected, and separate tensioning springs respectively connected to said arms.

3. A tillage implement comprising a frame carrying a ground working element, a pair of crank axles having members arranged in juxtaposition to each other and extending transversely of the frame and journaled thereto, land and furrow wheels connected to said axles respectively and arms projecting from the transverse members of the axles, respectively, in combination with a member slidable upon the frame and guided to traverse a substantially horizontal path, the rear end of said member being pivoted directly to one of said arms and its forward end having arcuately disposed teeth, a lever having its lower end pivoted to the forward end portion of the slidable member, a latch carried by said lever and selectively engageable with the teeth of the slidable member, and a link extending alongside the slidable member and having its forward end connected to the lever and its rear end connected to the other arm.

4. A tillage implement comprising a frame and a ground working member carried by the frame, a furrow wheel, a crank axle for the furrow wheel having a member extending transversely of the frame and journaled thereto and provided with an upwardly extending arm, a land wheel, a crank axle for the land wheel having a member extending transversely of the frame and journaled thereto and provided with an upwardly extending arm, a lever, a link connecting the lever to the arm projecting from the land wheel axle, a member slidable upon the frame and guided to traverse a substantially horizontal path, the rear end of said member being pivoted directly to the arm projecting from the furrow wheel axle and the forward end of said member carrying said lever and having arcuately disposed teeth, and a latch carried by the lever and arranged to engage said teeth to thereby cause rocking movement imparted to the furrow wheel axle to be transmitted to the land wheel axle, the said latch being disengageable from the sliding member to thereby destroy the operative connection between said axles whereby rocking movement imparted to either axle will not be transmitted to the other.

5. A tillage implement comprising a frame, a soil turning member carried thereby, a pair of crank axles having members extending transversely of the frame and journaled thereto, arms projecting from said members respectively, a forward furrow wheel connected to one of said axles, a land wheel connected to the other axle, a rear furrow wheel and its axle, a member slidable upon the frame and guided to traverse a substantially horizontal path longitudinally of the frame, one end of said member pivoted directly to one of said arms and its opposite end having arcuately disposed teeth, a link extending alongside the slidable member and having one of its ends pivoted directly to the other of said arms, a lever pivoted directly to the toothed end of the slidable member and to which an end of said link is directly pivoted, a latch carried by the lever in position to engage the teeth of the slidable member, and an operating connection between the slidable member and the rear furrow wheel axle.

6. A tillage implement comprising a frame, a soil turning member carried thereby, a pair of crank axles having members arranged in juxtaposition to each other and extending transversely of the frame and journaled thereto, arms projecting from said members respectively, a forward furrow wheel connected to one of said axles, a land wheel connected to the other axle, a rear furrow wheel and its axle, a member slidable upon the frame and guided to traverse a substantially horizontal path longitudinally of the frame, one end of said member pivoted directly to the arm projecting from the axle of the forward furrow wheel and its opposite end having arcuately disposed teeth, a link extending alongside the slidable member and having one of its ends pivoted directly to the arm projecting from the axle of the land wheel, a lever pivoted directly to the toothed end of the slidable member and to which an end of said link is directly pivoted, a latch carried by the lever in position to engage the teeth of the slidable member, means to rock the furrow wheel axle and an operating connection between the slidable member and the rear furrow wheel axle.

7. In a tillage implement, a frame, a soil turning member carried thereby, a first crank axle and a second crank axle, having members arranged in juxtaposition to each other and extending transversely of the frame and journaled thereto, arms projecting from said members, respectively, a forward furrow wheel connected to one of said axles, a land wheel connected to the other axle, a rear furrow wheel and its axle, a member slidable longitudinally of the frame and having one of its ends directly pivoted to the arm projecting from the first crank axle and its opposite end formed to provide a toothed sector, a power lift mechanism, having a connection with the first crank axle and the frame and including an adjusting lever settable into different selective positions, a second lever pivoted directly to the sector end of said slidable member and carried thereby and provided with a latch to engage the teeth of the sector, a link extending alongside the slidable member and connecting the second lever with the arm projecting from the second crank axle, and means to connect said slidable member with the rear furrow wheel axle, including a link pivoted at one end to said member.

8. In a tillage implement, a frame, a soil turning member carried thereby, a forward furrow wheel, a land wheel, a crank axle to which the forward furrow wheel is connected, a second crank axle to which the land wheel is connected, a first adjustable lever and a second adjustable lever independently operable to adjust opposite sides of the implement, respectively, means including power lift elements connecting the first of said levers with the corresponding crank axle, said crank axles having members arranged in juxtaposition to each other and extending transversely of the frame and journaled thereto, a first arm projecting from the transversely extending member of that crank axle to which power is applied by the power lift means in raising or lowering the implement and by said first lever in adjusting the corresponding side of the implement, a second arm, projecting from the other crank axle, a longitudinally extended member slidable longitudinally of the frame and having one of its ends pivoted directly to said first arm, a toothed sector carried by the opposite end of said member in operative relationship with the second lever, said second lever being pivoted directly to and thereby carried by said slidable member, a link connecting the second lever with the second arm, a rear furrow wheel and its axle, and a link connecting the slidable member with the rear furrow wheel axle.

9. In a power lift soil working implement, the combination with a soil working member, a support therefor, crank axles journaled to the support and operable to raise or lower the same by changes in their angles with relation to the ground, and ground wheels connected to said axles, of cranks extending from the journals of the axles, an adjusting lever having connection with one of the cranks, a slide connected to the other crank and carrying the lever, means for fixing the lever to the slide in selected positions, and means operable at will by one of the ground wheels to turn the axles in their bearings by power derived from the travel of the implement.

In testimony whereof I affix my signature.

CHARLES T. RAY.